United States Patent
Jandhyala et al.

(10) Patent No.: US 11,945,994 B1
(45) Date of Patent: Apr. 2, 2024

(54) METHOD TO DESIGN FOR PERMEABILITY OF PORTLAND BASED SYSTEMS

(71) Applicant: Halliburton Energy Services, Inc., Houston, TX (US)

(72) Inventors: Siva Rama Krishna Jandhyala, Houston, TX (US); Gunnar Lende, Stavanger (NO); Samuel J. Lewis, Houston, TX (US); Thomas Jason Pisklak, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/092,070

(22) Filed: Dec. 30, 2022

(51) Int. Cl.
C09K 8/467 (2006.01)
C04B 28/04 (2006.01)
C04B 40/00 (2006.01)
C04B 111/00 (2006.01)

(52) U.S. Cl.
CPC .............. *C09K 8/467* (2013.01); *C04B 28/04* (2013.01); *C04B 40/0032* (2013.01); *C04B 2111/00198* (2013.01); *C04B 2111/00267* (2013.01); *C04B 2111/00284* (2013.01); *C04B 2201/20* (2013.01)

(58) Field of Classification Search
CPC ..... C09K 8/467; C04B 28/04; C04B 40/0032; C04B 2111/00198; C04B 2111/00267; C04B 2111/00284; C04B 2201/20
See application file for complete search history.

(56) References Cited

U.S. PATENT DOCUMENTS

| | | |
|---|---|---|
| 6,626,243 B1 | 9/2003 | Go Boncan |
| 6,799,636 B2 | 10/2004 | Funkhouser et al. |
| 8,276,666 B2 | 10/2012 | Ravi et al. |
| 11,242,479 B2 | 2/2022 | Pisklak et al. |
| 11,434,410 B2 | 9/2022 | Lewis et al. |
| 11,441,415 B2 | 9/2022 | Pisklak et al. |
| 11,499,084 B2 | 11/2022 | Pearl, Jr. et al. |

(Continued)

FOREIGN PATENT DOCUMENTS

| | | | | |
|---|---|---|---|---|
| WO | WO-2018156123 A1 | * | 8/2018 | ............. C04B 18/08 |
| WO | 2022010494 | | 1/2022 | |

OTHER PUBLICATIONS

Zhang et al., Determination of Water Permeability for Cementitious Materials with Minimized Batch Effect, Department of Civil and Environmental Engineering, Princeton University, Princeton, NJ accessed Oct. 19, 2022.

(Continued)

*Primary Examiner* — Crystal J Lee
(74) *Attorney, Agent, or Firm* — Thomas Rooney; C. Tumey Law Group PLLC (57) ABSTRACT

A method of designing a cement slurry may include: (a) selecting a target permeability and a density requirement; (b) inputting the target permeability into a permeability model and generating a proposed cement composition using the permeability model, wherein the proposed cement composition comprises at least a cement and concentration thereof, and a water and concentration thereof such that a cement slurry formed from the proposed cement composition water meet the density requirement; (c) preparing the cement slurry based on the proposed cement composition; and (d) introducing the cement slurry into a wellbore and allowing the cement slurry to set to form a hardened cement.

20 Claims, 4 Drawing Sheets

(56) References Cited

U.S. PATENT DOCUMENTS

| | | |
|---|---|---|
| 11,535,789 B1 | 12/2022 | Patil et al. |
| 2006/0047527 A1 | 3/2006 | Caveny et al. |
| 2007/0056383 A1 | 3/2007 | Deeg |
| 2014/0073537 A1 | 3/2014 | Ravi et al. |
| 2014/0251614 A1 | 9/2014 | Muthusamy et al. |
| 2015/0175481 A1 | 6/2015 | Pisklak et al. |
| 2015/0321953 A1* | 11/2015 | Porcherie ............... C04B 28/04 106/713 |
| 2017/0183558 A1 | 6/2017 | Funkhouser et al. |
| 2018/0163121 A1 | 6/2018 | Agapiou et al. |
| 2018/0171204 A1 | 6/2018 | Agapiou et al. |
| 2019/0040297 A1* | 2/2019 | Terrier ................... C04B 28/04 |
| 2019/0358853 A1 | 11/2019 | Morgan et al. |
| 2019/0367797 A1 | 12/2019 | Morgan et al. |
| 2020/0332172 A1 | 10/2020 | Pisklak et al. |
| 2020/0332643 A1 | 10/2020 | Pisklak et al. |
| 2020/0333318 A1 | 10/2020 | Benkley et al. |
| 2020/0369942 A1 | 11/2020 | Singh et al. |
| 2021/0147305 A1 | 5/2021 | Singh et al. |
| 2021/0332284 A1 | 10/2021 | Pisklak et al. |
| 2021/0403791 A1 | 12/2021 | Pearl, Jr. et al. |
| 2022/0089936 A1 | 3/2022 | Pearl, Jr. et al. |

OTHER PUBLICATIONS

Robeson et al., An empirical correlation of gas permeability and permselectivity in polymers and its theoretical basis, Journal of Membrane Science, Apr. 30, 2009, Department of Chemical Engineering, University of Texas at Austin, Austin, TX, USA.

Han et al., A numerical model for permeability of cement mortar considering the interfacial transition zone; Magazine of Concrete Research, Jan. 2021, pp. 1-14, vol. 73 Issue 1.

A. Aït-Mokhtar et al., A new model to calculate water permeability of cement-based materials from MIP results, Advances in Cement Research, May 5, 2015, pp. 43-49, vol. 14 Issue 2.

Breysse et al., Modelling of permeability in cement-based materials: Part 1-uncracked medium, Cement and Concrete Research, 1997, pp. 761-775, vol. 27, No. 5, Pergamon, USA.

International Search Report and Written Opinion for International Patent Application No. PCT/US2023/027228 dated Oct. 20, 2023. PDF file. 8 pages.

\* cited by examiner

METHOD TO DESIGN FOR PERMEABILITY OF PORTLAND BASED SYSTEMS

BACKGROUND

In well cementing, such as well construction and remedial cementing, cement compositions are commonly utilized. Cement slurries may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement slurry may be pumped into an annulus between the walls of the well bore and the exterior surface of the pipe string disposed therein. The cement slurry may set in the annular space, thereby forming an annular sheath of hardened cement (i.e., a cement sheath) that may support and position the pipe string in the well bore and may bond the exterior surface of the pipe string to the subterranean formation. Among other things, the cement sheath surrounding the pipe string functions to prevent the migration of fluids and gases in the annulus, as well as protecting the pipe string from corrosion. Cement slurries also may be used in remedial cementing methods, for example, to seal cracks or holes in pipe strings or cement sheaths, to seal highly permeable formation zones or fractures, to place a cement plug, and the like.

A challenge in well cementing is the development of satisfactory properties of the cement after placement. Cement is provided as a dry powder which is mixed with water to form a suspension, also referred to as a cement slurry, comprising individual hydrating cement grains dispersed in the water. As the cementitious reactions occur, the cement slurry sets to form a hardened mass comprising individual grains of set cement bound together to form a cohesive mass of cemented together grains. A set cement typically has some degree of porosity arising from the space that manifests between the individual grains cemented together. Porosity can also arise from space left where the water was disposed in the cement slurry. The porosity of a set cement is a function of several factors, including but not limited to, the amount of water present in the cement slurry, the particle size and distribution thereof of the dry powder used to mix the cement slurry, the chemical identity of the cement, and curing conditions.

Permeability of a set cement is a quantitative description of the ease at which fluids or gases can penetrate and flow through the set cement where the permeability is primarily a function of porosity of the cement. Flow through a porous cement can result in sustained casing pressure and loss of zonal isolation. Fluids which flow through the set cement can have deleterious effects on the physical properties of the set cement by transporting reactive species into the set cement which can chemically react with the set cement to weaken the structural integrity of the set cement. Fluids can also transport material out of the set cement, including, calcium ions, such that the integrity of the set cement is reduced. Water-saturated cement can also be subjected to increased internal expansive pressure from rising temperature in the wellbore. Thus, permeability of the set cement is a consideration when designing the cement slurry.

There is no quantitative method to design for a target permeability of a set cement. Laboratory methods to design for permeability include performing permeability tests on a variety of cement formulations at varying cure temperatures and pressures. The cement formulations typically include varying amounts of cement, supplementary cementitious materials, inert materials, water, and chemical additives. Each of the cement formulations is evaluated for permeability and a cement formulation is selected which meets the permeability requirement as well as other mechanical property requirements such as density, compressive strength, and Young's Modulus, among other properties. The process may be time consuming, and the resulting slurry may be complex with many ingredients. Furthermore, the cement components available in any one particular geographical region may vary in slurry from those of another region thereby further complicating the process of designing a cement slurry which meets all required parameters, including permeability.

BRIEF DESCRIPTION OF THE DRAWINGS

These drawings illustrate certain aspects of some of the embodiments of the present disclosure and should not be used to limit or define the disclosure.

DETAILED DESCRIPTION

The present disclosure may generally relate to cementing methods and systems. More particularly, embodiments may be directed to designing cement slurries which set to form a targeted permeability, where the cement slurries are designed based at least partially on a permeability model to achieve the targeted permeability.

Cement slurries may contain cement, supplementary cementitious additives, inert materials, and chemical additives. A cement slurry for use in cementing wellbores is typically mixed at a wellbore pad site by combining a dry powder comprising cement, and optionally, dry supplementary cementitious additives, inert materials, and dry chemical additives with water and optionally liquid chemical additives, using cement mixing equipment. The cement slurry is typically formulated such that the wait on cement time (WOC), or time until the cement has cured and reached a compressive strength where the next wellbore operation can commence, is relatively short. The cement slurry will cure to reach the ultimate compressive strength over the course of days to weeks. During the curing process, pores form in the set cement from several sources which mainly include water and air. For a pure portland cement without supplementary cementitious materials and chemical additives, approximately 25 pounds to water is required to fully hydrate 100 pounds of portland cement. However, to form a pumpable slurry which can be placed in a wellbore and which can maintain consistent mix properties, a higher water to cement ratio than 0.25 is often utilized such that the cement slurry has workability and can be readily placed. The excess water is distributed throughout the set cement and manifests as capillary pores and gel pores in the set cement. Capillary pores are relatively larger water-filled pores which form when the water is no longer exposed to un-hydrated cement grains but to hydrated cement product and exists between hydrated cement products. Gel pores are water that is trapped within hydrated cement product within calcium silicate hydrate and calcium hydroxide gel. Porosity can be measured by standard test such as ASTM C642-21 titled "Standard Test Method for Density, Absorption, and Voids in Hardened Concrete" dated 2022. The porosity of a set cement may not be static. Over time the porosity may decrease as the water from capillary pores and gel pores is transported out of the cement. The pores may collapse and thereby reducing the porosity of the set cement.

Permeability is typically measured in a laboratory by applying a constant differential pressure across a cement sample and measuring a steady state flow rate of the fluid while pressure is applied. The measured pressure drop and flow rate are used in a Darcy law linear flow equation to calculate the permeability of cement sample. Permeability of cement may be measured by several methods including, but not limited to, ASTM D2434-22 titled "Standard Test Methods for Measurement of Hydraulic Conductivity of Coarse-Grained Soils" which may be modified for measuring permeability of cement, as well as API 10B-2 titled "Recommended Practice for Testing Well Cements; First Edition" with permeability and testing thereof found in section 11.

The ability of a portland based cement to provide long-term zonal isolation is significantly affected by the permeability of the portland cement. Permeability occurs when the pores present in the set cement become interconnected and allow for fluids to flow through an otherwise mechanically intact barrier. In general, the permeability of the cement may be a function of the porosity of the cement, which in turn is largely governed by the water to cement ratio where a higher water to cement ratio generally correlated with a higher porosity and thereby higher permeability. It is often a design criterion for a set cement to have a permeability lower than or equal to a maximum specified value. The maximum permeability may be governed by local laws, regulations, industry best practices in the geographic location, or may be specified for a particular well by an owner or operator. For example, Norway publishes the Norwegian standards NOR-SOK D010 titled "Well integrity in drilling and well operations", which specifies that the maximum allowable permeability value for a well barrier cement is 5 micro Darcy. Permeability may be of particular concern in wellbores where there is carbon dioxide and/or hydrogen sulfide and in high pressure reservoirs. In wellbores, such as carbon capture underground storage wells, the maximum allowed permeability of the set cement may be relatively lower than in oil and gas wells necessitating a relatively less porous set product. Permeability is also a concern in abandonment plugs where permanent isolation is required.

The porosity and the resultant permeability of a set cement may be a function of many factors, including but not limited to, curing pressure, curing pressure ramp rate, curing temperature, curing temperature ramp rate, water to cement ratio of the cement slurry, and by extension, density of the cement slurry, composition of the cement slurry including chemical identities of the cement, supplementary cementitious materials, chemical additives such as film forming additives, and amounts thereof, as well as volume averaged value of particle size distribution (PSD) (such as D30, D50, D70 and/or D90) of solids in the dry blend and by extension surface area of particles in the dry blend, mass averaged values of $CaO/SiO_2$ ratio of the dry blend, particle morphology, cementitious reactivity rate, crystallinity, elemental composition, water requirement of cement components, and solubility of cement components including time variant solubility of cement components, among other factors. Designing a cement slurry to set to form a hardened mass with a specified permeability is an inefficient trial and error process often requiring multiple iterations of selecting slurry components and mass fractions thereof and testing the permeability for a set cement formed from the slurry. Small changes in composition may result in widely varying permeability which is further compounded by cementitious materials varying across different geographical areas. As such, a cement recipe that is prepared in one region may have a different permeability than the same recipe prepared in a different region with same class of materials, due to the differences in mineralogy and manufacturing processes of the cement components. The differences in permeability may be difficult to predict as the permeability of a set cement is a complex function of various interacting factors. A permeability model will be developed below which can be used to develop a cement slurry which will set to form a hardened cement with a specified permeability.

Figure 1:
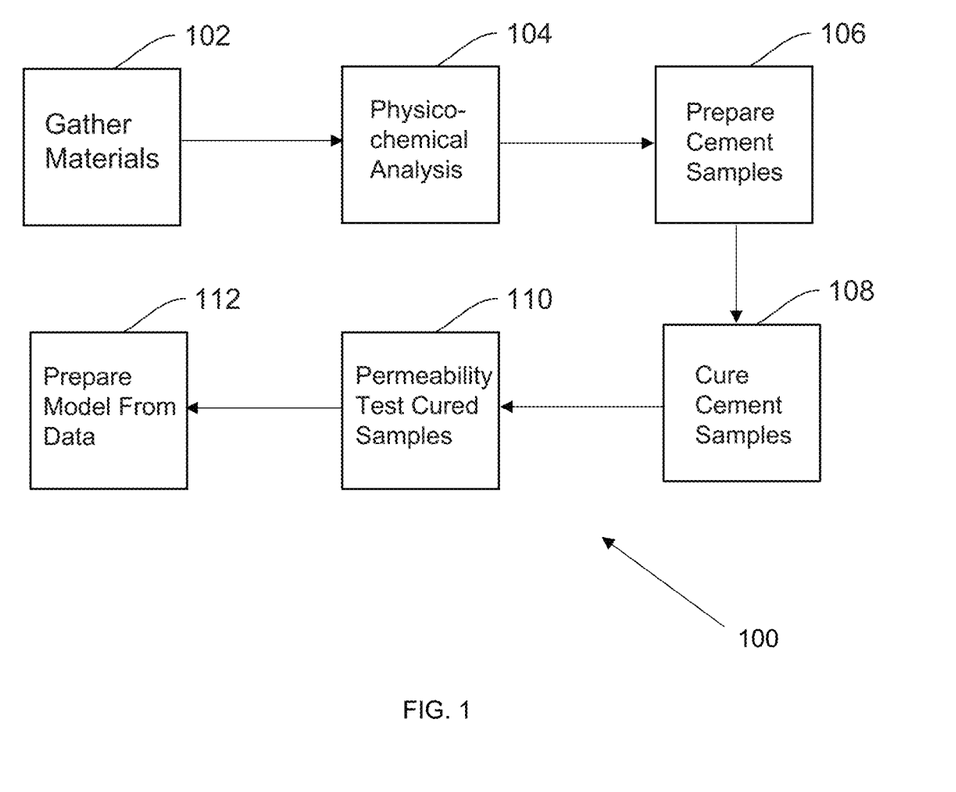
FIG. 1 illustrates block flow diagram of a process for developing a permeability model for cement slurries.

FIG. 1 illustrates block flow diagram of a process 100 for developing a permeability model for cement slurries. Process 100 begins with block 102 where cement slurry components are gathered. Some examples of cement slurry components include cements, supplementary cementitious materials, inert materials, chemical additives, and water. Cement slurry component material availability is typically location dependent whereby some geographic locations may have access to bulk materials that other geographic locations do not. Further, bulk materials such as mined materials and cements may vary across geographic locations due to differences in raw materials for manufacturing and manufacturing methods, as well as natural variations among deposits of mineable minerals across geographic locations. The cement slurry components of interest may be tailored to the materials available in a particular region or area. From block 102, process 100 proceeds to block 104 where physicochemical properties of the cement slurry components from block 102 are analyzed. Physicochemical properties can include a variety of physical properties and chemical properties such as morphology, crystallinity, surface area, water requirement, bulk density, solubility, identity of chemical species in the cement slurry components and amounts thereof including calcium oxide and silicon oxide, particle size and distribution, and any other suitable physicochemical properties. From block 104, process 100 proceed to block 106 where a plurality of cement slurries with varying amounts of cement slurry components from block 102 are prepared. For example, cement slurries with varying amounts of cement and water can be prepared, cement slurries with varying amounts of supplementary cementitious materials can be prepared, cement slurries with varying amounts of chemical additives can be prepared, and cement slurries with varying particle size distributions of cement slurry components can be prepared. The cement slurries may be prepared such that they contain a representative sample of cement slurries which can be expected to be used in a wellbore operation such that the permeability model generated is representative of cement slurries which are pumped in wellbore operations. For example, the cement slurries can be prepared such that they represent the typical density values used in wellbore operations. The cement slurries can be prepared such that they represent the typical compositions utilized in wellbore operations. From block 106, process 100 proceeds to block 108 where the cement slurries prepared in block 106 are cured at varying temperatures and pressures which may be representative pressures and temperatures encountered in wellbore cementing. The curing can be carried out in any suitable manner, including in a pressurized consistometer. From block 108, process 100 proceeds to block 110 where permeability tests are performed to determine the permeability of the cured cement. As mentioned above, the permeability of a cured cement may be dependent upon the time the permeability is measured where a set cement that is relatively older may have relatively less permeability than the same set cement which is relatively younger. Factors such as exposure to high temperature during curing may also cause the permeability to increase substantially. Thus, the permeability testing may be performed at varying timescales such that a time dependent permeability may be captured in the permeability model. From block 110, process 100 proceeds to block 112 where the physicochemical properties from block 104, compositions of cement slurries from block 106, and the measured permeability from block 110 is fit to a permeability model using regression analysis techniques to form a fitted permeability model. A factor analysis can be performed to identify the significant factors which contribute to permeability and the form of the permeability model can be modified to include only the significant factors of interest. The fitted permeability model resulting from the regression analysis can then be used to design a cement with a specified permeability.

A generalized form of a permeability model is shown in Equation 1 where the permeability K is described as a function of factors of volume of water to volume of solids ratio, concentration of inert materials, $D_{90}$ particle size distribution, calcium oxide to silica ratio, temperature, pressure, and physicochemical properties.

$$K = f\left(\frac{\text{vol water}}{\text{vol solids}}, C_{inerts}, D_{90}, \frac{CaO}{SiO_2}, T, P, \text{physicochemical properties}\right) \quad \text{Equation 1}$$

Alternatively, another form of a permeability model is shown in Equation 2 where the permeability K is described as a function of factors of volume of water to volume of slurry, particle size distribution, calcium oxide to silica ratio, concentration of inert materials, temperature, and pressure.

$$K = f\left(\frac{\text{vol water}}{\text{vol slurry}}, PSD, \frac{CaO}{SiO_2}, C_{inerts}, T, P\right) \quad \text{Equation 2}$$

The permeability model can be of any form including, but not limited to, linear form, polynomial form, trigonometric form, exponential form, logarithmic form, power law form, integral form, derivative form, parametric form, and combinations thereof, or any other form. A particular form of the permeability model may include Equation 3 where $A_0$, $A_1$, $A_2$, and $A_3$ are model coefficients, and the model includes factors of volume of water to volume of slurry, particle size distribution (PSD), and calcium oxide to silica ratio.

$$K = A_0\left(\frac{\text{vol water}}{\text{vol slurry}}\right)^{A_1} \times e^{A_2 PSD} \times e^{A_3 \frac{CaO}{SiO_2}} \quad \text{Equation 3}$$

Another form of the permeability model may include Equation 4 where $A_0$, $A_1$, $A_2$, $A_3$, and $A_4$ are model coefficients, and the model includes independent variables of volume of water to volume of slurry, particle size distribution (PSD), calcium oxide to silica ratio and concentration of inert materials ($C_{inerts}$).

$$K = A_0 + A_1\left(\frac{\text{vol water}}{\text{vol slurry}}\right) + A_2 PSD + A_3\frac{CaO}{SiO_2} + A_4 C_{inerts} \quad \text{Equation 4}$$

The form of the permeability model and the independent factors which are considered in each model may vary depending on which factors are significant to include in the permeability model. Significant factors can be identified using known statistical methods. The permeability model can be fitted using any suitable regression analysis techniques, including without limitation, linear regression, multiple linear regression, multivariate regression, polynomial regression, quantile regression, ridge regression, lasso regression, elastic net regression, principal components regression, partial least regression, support vector regression, and combinations thereof. Alternately, any black box models such as neural nets and/or tree-based models can be used to build permeability model.

Figure 2:
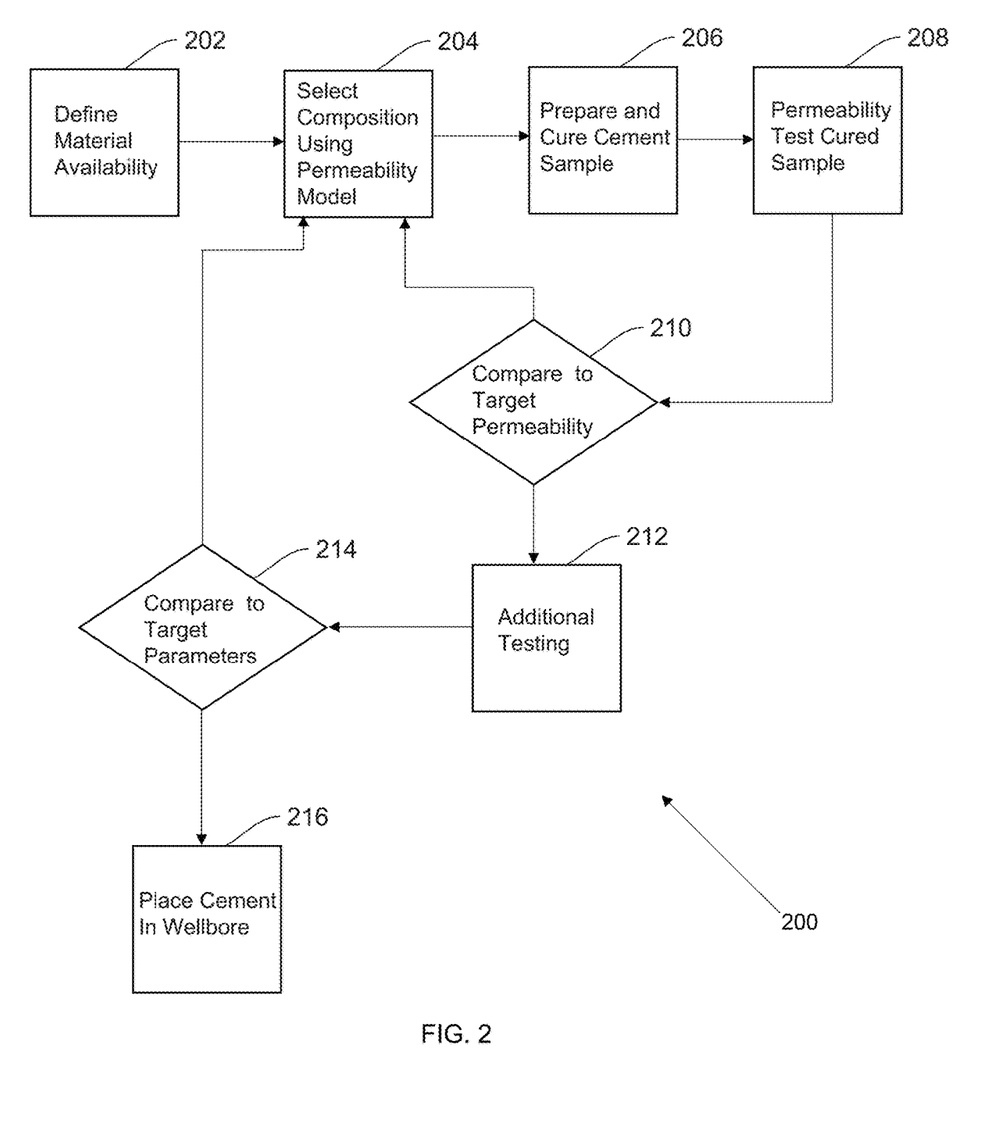
FIG. 2 illustrates a block flow diagram of a process for developing a cement slurry which sets to form a set cement with a specified permeability.

FIG. 2 illustrates a block flow diagram of a process 200 for developing a cement slurry which sets to form a set cement with a specified permeability. Process 200 begins with block 202 where bulk material availability such as cement, supplementary cementitious materials, and cement additives available may be defined. Bulk material availability is typically location dependent whereby some geographic locations may have access to bulk materials that other geographic locations do not. Further, bulk materials such as mined materials and cements may vary across geographic locations due to differences in raw materials for manufacturing and manufacturing methods, as well as natural variations among deposits of mineable minerals across geographic locations. In block 202, a target permeability and engineering parameters such as density requirement, compressive strength, yield point, fluid loss control requirements, rheology requirements, and stability requirements, as well as cure temperature and pressure may be defined. From block 202, process 200 proceeds to block 204 where a proposed cement composition is selected using a permeability model as developed above. For example, any of Equations 1-4 may be used or any other form of the permeability model. The selected permeability may be used as the target (y-value) and the permeability model may be solved for the independent variables which meet the selected permeability. The permeability model may include any of the dependent variables discussed above such as composition, water to solids ratio, temperature, pressure, particle size distribution, and physicochemical properties, for example.

The proposed cement composition may include cement components and mass fractions thereof, water and mass fraction thereof, and optionally chemical additives and mass fractions thereof, supplementary cement materials and mass fractions thereof, and inert materials and mass fractions thereof, based on the bulk material availability defined in block 202. The engineering parameters defined in block 202 such as density can be used to reduce the degrees of freedom in defining the proposed cement composition. From block 204, process 200 proceeds to block 206 where a cement slurry is prepared based on the proposed cement composition generated in block 204. The cement slurry may be cured at the temperature and pressure defined in block 202. From block 206, process 200 proceeds to block 208 where the permeability of the cured cement prepared in block 208 is tested. From block 208, process 200 proceeds to decision 210 where the permeability of the cured cement from block 206 is compared to the target permeability defined in block 202. If the permeability of the cured cement from block 206 is greater than the target permeability defined in block 202, process 200 proceeds back to block 204 where a second proposed cement composition is generated, whereby the second proposed cement composition is disparate from the first proposed cement composition. The second proposed cement composition may include disparate cement components and/or disparate mass fractions thereof and or chemical additives and components thereof. The second proposed cement is used to prepare a cement slurry which is cured, and the permeability tested. The process may be repeated until a cement composition which has less than or equal to the target permeability defined in block 202. If the permeability of the cured cement from block 206 is less than or equal to the target permeability defined in block 202, proceed 200 proceeds to block 212 where additional tests may be performed to ensure that the proposed cement composition meets the engineering parameters defined in block 202. From block 212, process 200 proceeds to decision 214. If the proposed cement composition does not meet the engineering parameters, process 200 proceeds back to block 204 where another cement composition is generated. If the proposed cement composition meets the engineering parameters, process 200 proceeds to block 216. In block 216 a cement slurry is prepared according to the proposed cement composition and introduced into a wellbore.

Cement compositions described herein may generally include a hydraulic cement and water. A variety of hydraulic cements may be utilized in accordance with the present disclosure, including, but not limited to, those comprising calcium, aluminum, silicon, oxygen, iron, and/or sulfur, which set and harden by reaction with water. Suitable hydraulic cements may include, but are not limited to, portland cements, pozzolanic cements, gypsum cements, high alumina content cements, silica cements, and any combination thereof. In certain examples, the hydraulic cement may include a portland cement. In some examples, the portland cements may include portland cements that are classified as Classes A, C, H, and G cements according to American Petroleum Institute, API Specification for Materials and Testing for Well Cements, API Specification 10, Fifth Ed., Jul. 1, 1990. In addition, hydraulic cements may include cements classified by American Society for Testing and Materials (ASTM) in C150 (Standard Specification for portland Cement), C595 (Standard Specification for Blended Hydraulic Cement) or C1157 (Performance Specification for Hydraulic Cements) such as those cements classified as ASTM Type I, II, or III. The hydraulic cement may be included in the cement composition in any amount suitable for a particular composition. Without limitation, the hydraulic cement may be included in the cement compositions in an amount in the range of from about 10% to about 80% by weight of dry blend in the cement composition. For example, the hydraulic cement may be present in an amount ranging between any of and/or including any of about 10%, about 15%, about 20%, about 25%, about 30%, about 35%, about 40%, about 45%, about 50%, about 55%, about 60%, about 65%, about 70%, about 75%, or about 80% by weight of the cement compositions.

The water may be from any source provided that it does not contain an excess of compounds that may undesirably affect other components in the cement compositions. For example, a cement composition may include fresh water or saltwater. Saltwater generally may include one or more dissolved salts therein and may be saturated or unsaturated as desired for a particular application. Seawater or brines may be suitable for use in some examples. Further, the water may be present in an amount sufficient to form a pumpable slurry. In certain examples, the water may be present in the cement composition in an amount in the range of from about 33% to about 200% by weight of the cementitious materials. For example, the water cement may be present in an amount ranging between any of and/or including any of about 33%, about 50%, about 75%, about 100%, about 125%, about 150%, about 175%, or about 200% by weight of the cementitious materials. The cementitious materials referenced may include all components which contribute to the compressive strength of the cement composition such as the hydraulic cement and supplementary cementitious materials, for example.

As mentioned above, the cement composition may include supplementary cementitious materials. The supplementary cementitious material may be any material that contributes to the desired properties of the cement composition. Some supplementary cementitious materials may include, without limitation, fly ash, blast furnace slag, silica fume, pozzolans, kiln dust, and clays, for example.

The cement composition may include kiln dust as a supplementary cementitious material. "Kiln dust," as that term is used herein, refers to a solid material generated as a by-product of the heating of certain materials in kilns. The term "kiln dust" as used herein is intended to include kiln dust made as described herein and equivalent forms of kiln dust. Depending on its source, kiln dust may exhibit cementitious properties in that it can set and harden in the presence of water. Examples of suitable kiln dusts include cement kiln dust, lime kiln dust, and combinations thereof. Cement kiln dust may be generated as a by-product of cement production that is removed from the gas stream and collected, for example, in a dust collector. Usually, large quantities of cement kiln dust are collected in the production of cement that are commonly disposed of as waste. The chemical analysis of the cement kiln dust from various cement manufactures varies depending on a number of factors, including the particular kiln feed, the efficiencies of the cement production operation, and the associated dust collection systems. Cement kiln dust generally may include a variety of oxides, such as $SiO_2$, $Al_2O_3$, $Fe_2O_3$, CaO, MgO, $SO_3$, $Na_2O$, and $K_2O$. The chemical analysis of lime kiln dust from various lime manufacturers varies depending on several factors, including the particular limestone or dolomitic limestone feed, the type of kiln, the mode of operation of the kiln, the efficiencies of the lime production operation, and the associated dust collection systems. Lime kiln dust generally may include varying amounts of free lime and free magnesium, limestone, and/or dolomitic limestone and a variety of oxides, such as $SiO_2$, $Al_2O_3$, $Fe_2O_3$, CaO, MgO, $SO_3$, $Na_2O$, and $K_2O$, and other components, such as chlorides. A cement kiln dust may be added to the cement composition prior to, concurrently with, or after activation. Cement kiln dust (CKD) may include a partially calcined kiln feed which is removed from the gas stream and collected in a dust collector during the manufacture of cement. The chemical analysis of CKD from various cement manufactures varies depending on a number of factors, including the particular kiln feed, the efficiencies of the cement production operation, and the associated dust collection systems. CKD generally may comprise a variety of oxides, such as $SiO_2$, $Al_2O_3$, $Fe_2O_3$, CaO, MgO, $SO_3$, $Na_2O$, and K$_2$O. The CKD and/or lime kiln dust may be included in examples of the cement composition in an amount suitable for a particular application.

In some examples, the cement composition may further include one or more of slag, natural glass, shale, amorphous silica, or metakaolin as a supplementary cementitious material. Slag is generally a granulated, blast furnace by-product from the production of cast iron including the oxidized impurities found in iron ore. The cement may further include shale. A variety of shales may be suitable, including those including silicon, aluminum, calcium, and/or magnesium. Examples of suitable shales include vitrified shale and/or calcined shale. In some examples, the cement composition may further include amorphous silica as a supplementary cementitious material. Amorphous silica is a powder that may be included in embodiments to increase cement compressive strength. Amorphous silica is generally a byproduct of a ferrosilicon production process, wherein the amorphous silica may be formed by oxidation and condensation of gaseous silicon suboxide, SiO, which is formed as an intermediate during the process In some examples, the cement composition may further include a variety of fly ashes as a supplementary cementitious material which may include fly ash classified as Class C, Class F, or Class N fly ash according to American Petroleum Institute, API Specification for Materials and Testing for Well Cements, API Specification 10A, Fifth Ed., Jul. 1, 1990 or ASTM C618-19 "Standard Specification for Coal Fly Ash and Raw or Calcined Natural Pozzolan for Use in Concrete". In some examples, the cement composition may further include zeolites as supplementary cementitious materials. Zeolites are generally porous alumino-silicate minerals that may be either natural or synthetic. Synthetic zeolites are based on the same type of structural cell as natural zeolites and may comprise aluminosilicate hydrates. As used herein, the term "zeolite" refers to all natural and synthetic forms of zeolite.

Where used, one or more of the aforementioned supplementary cementitious materials may be present in the cement composition. For example, without limitation, one or more supplementary cementitious materials may be present in an amount of about 0.1% to about 80% by weight of the cement composition. For example, the supplementary cementitious materials may be present in an amount ranging between any of and/or including any of about 0.10%, about 10%, about 20%, about 30%, about 40%, about 50%, about 60%, about 70%, or about 80% by weight of the cement.

In some examples, the cement composition may further include hydrated lime. As used herein, the term "hydrated lime" will be understood to mean calcium hydroxide. In some embodiments, the hydrated lime may be provided as quicklime (calcium oxide) which hydrates when mixed with water to form the hydrated lime. The hydrated lime may be included in examples of the cement composition, for example, to form a hydraulic composition with the supplementary cementitious components. For example, the hydrated lime may be included in a supplementary cementitious material-to-hydrated-lime weight ratio of about 10:1 to about 1:1 or 3:1 to about 5:1. Where present, the hydrated lime may be included in the set cement composition in an amount in the range of from about 10% to about 100% by weight of the cement composition, for example. In some examples, the hydrated lime may be present in an amount ranging between any of and/or including any of about 10%, about 20%, about 40%, about 60%, about 80%, or about 100% by weight of the cement composition. In some examples, the cementitious components present in the cement composition may consist essentially of one or more supplementary cementitious materials and the hydrated lime. For example, the cementitious components may primarily comprise the supplementary cementitious materials and the hydrated lime without any additional components (e.g., portland cement, fly ash, slag cement) that hydraulically set in the presence of water.

Lime may be present in the cement composition in several; forms, including as calcium oxide and or calcium hydroxide or as a reaction product such as when portland cement reacts with water. Alternatively, lime may be included in the cement composition by amount of silica in the cement composition. A cement composition may be designed to have a target lime to silica weight ratio. The target lime to silica ratio may be a molar ratio, molal ratio, or any other equivalent way of expressing a relative amount of silica to lime. Any suitable target time to silica weight ratio may be selected including from about 10/90 lime to silica by weight to about 40/60 lime to silica by weight. Alternatively, about 10/90 lime to silica by weight to about 20/80 lime to silica by weight, about 20/80 lime to silica by weight to about 30/70 lime to silica by weight, or about 30/70 lime to silica by weight to about 40/63 lime to silica by weight.

Other additives suitable for use in subterranean cementing operations also may be included in embodiments of the cement composition. Examples of such chemical additives include, but are not limited to: weighting agents, lightweight additives, gas-generating additives, mechanical-property-enhancing additives, lost-circulation materials, fibers, filtration-control additives, fluid-loss-control additives, defoaming agents, foaming agents, thixotropic additives, and combinations thereof. In embodiments, one or more of these additives may be added to the cement composition after storing but prior to the placement of a cement composition into a subterranean formation. In some examples, the cement composition may further include a dispersant. Examples of suitable dispersants include, without limitation, sulfonated-formaldehyde-based dispersants (e.g., sulfonated acetone formaldehyde condensate) or polycarboxylated ether dispersants. In some examples, the dispersant may be included in the cement composition in an amount in the range of from about 0.01% to about 5% by weight of the cementitious materials. In specific examples, the dispersant may be present in an amount ranging between any of and/or including any of about 0.01%, about 0.1%, about 0.5%, about 1%, about 2%, about 3%, about 4%, or about 5% by weight of the cementitious materials.

In some examples, the cement composition may further include a set retarder. A broad variety of set retarders may be suitable for use in the cement compositions. For example, the set retarder may comprise phosphonic acids, such as ethylenediamine tetra(methylene phosphonic acid), diethylenetriamine penta(methylene phosphonic acid), etc.; lignosulfonates, such as sodium lignosulfonate, calcium lignosulfonate, etc.; salts such as stannous sulfate, lead acetate, monobasic calcium phosphate, organic acids, such as citric acid, tartaric acid, etc.; cellulose derivatives such as hydroxyl ethyl cellulose (HEC) and carboxymethyl hydroxyethyl cellulose (CMHEC); synthetic co- or ter-polymers comprising sulfonate and carboxylic acid groups such as sulfonate-functionalized acrylamide-acrylic acid co-polymers; borate compounds such as alkali borates, sodium metaborate, sodium tetraborate, potassium pentaborate; derivatives thereof, phosphonic acid derivatives, or mixtures thereof. Generally, the set retarder may be present in the cement composition in an amount sufficient to delay the setting for a desired time. In some examples, the set retarder may be present in the cement composition in an amount in the range of from about 0.01% to about 10% by weight of the cementitious materials. In specific examples, the set retarder may be present in an amount ranging between any of and/or including any of about 0.01%, about 0.1%, about 1%, about 2%, about 4%, about 6%, about 8%, or about 10% by weight of the cementitious materials.

In some examples, the cement composition may further include an accelerator. A broad variety of accelerators may be suitable for use in the cement compositions. For example, the accelerator may include, but are not limited to, aluminum sulfate, alums, calcium chloride, calcium nitrate, calcium nitrite, calcium formate, calcium sulphoaluminate, calcium sulfate, gypsum-hemihydrate, sodium aluminate, sodium carbonate, sodium chloride, sodium silicate, sodium sulfate, ferric chloride, or a combination thereof. In some examples, the accelerators may be present in the cement composition in an amount in the range of from about 0.01% to about 10% by weight of the cementitious materials. In specific examples, the accelerators may be present in an amount ranging between any of and/or including any of about 0.01%, about 0.1%, about 1%, about 2%, about 4%, about 6%, about 8%, or about 10% by weight of the cementitious materials.

The cement compositions of the present application may have any suitable permeability such as permeabilities in a range of about 0 nano-Darcy (nD) to about 500 milli-Darcy (mD). Alternatively, in a range of about 0 nD to about 10 nD, about 0 nD to about 500 nD, about 10 nD to about 1000 nD, about 1000 nD to about 10,000 nD, about 10,000 nD to about 50,000 nD, about 50,000 nD to about 100,000 nD (0.1 mD), about 0.1 mD to about 1 mD, about 1 mD to about 10 mD, about 10 mD to about 50 mD, about 50 mD to about 100 mD, about 100 mD to about 500 mD, or any ranges therebetween.

Cement compositions generally should have a density suitable for a particular application. By way of example, the cement composition may have a density in the range of from about 8 pounds per gallon ("ppg") (959 kg/m$^3$) to about 20 ppg (2397 kg/m$^3$), or about 8 ppg to about 12 ppg (1437. kg/m$^3$), or about 12 ppg to about 16 ppg (1917.22 kg/m$^3$), or about 16 ppg to about 20 ppg (2397 kg/m$^3$), or any ranges therebetween. Examples of the cement compositions may be foamed or unfoamed or may comprise other means to reduce their densities, such as hollow microspheres, low-density elastic beads, or other density-reducing additives known in the art.

The cement slurries disclosed herein may be used in a variety of subterranean applications, including primary and remedial cementing. The cement slurries may be introduced into a subterranean formation and allowed to set. In primary cementing applications, for example, the cement slurries may be introduced into the annular space between a conduit located in a wellbore and the walls of the wellbore (and/or a larger conduit in the wellbore), wherein the wellbore penetrates the subterranean formation. The cement slurry may be allowed to set in the annular space to form an annular sheath of hardened cement. The cement slurry may form a barrier that prevents the migration of fluids in the wellbore. The cement composition may also, for example, support the conduit in the wellbore. In remedial cementing applications, the cement compositions may be used, for example, in squeeze cementing operations or in the placement of cement plugs. By way of example, the cement compositions may be placed in a wellbore to plug an opening (e.g., a void or crack) in the formation, in a gravel pack, in the conduit, in the cement sheath, and/or between the cement sheath and the conduit (e.g., a micro annulus).

Figure 3:
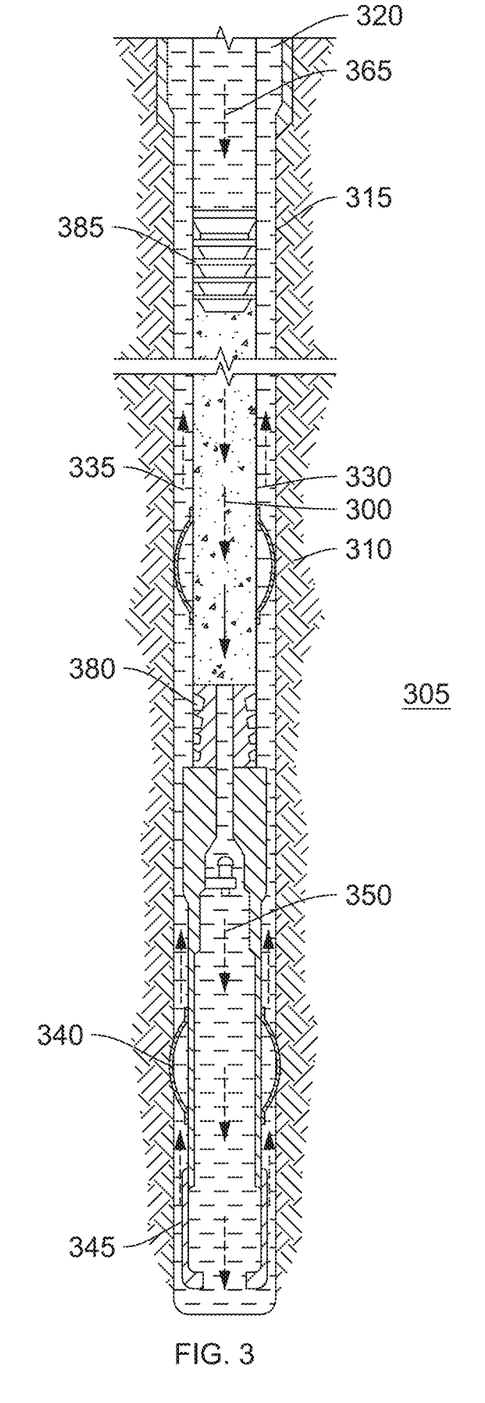
FIG. 3 illustrates introduction of a cement slurry into a wellbore.

Reference is now made to FIG. 3, illustrating use of a cement slurry 300. Cement slurry 300 may comprise any of the components described herein and may be designed using a permeability model as described above. Cement slurry 300 may be placed into a subterranean formation 305 in accordance with example systems, methods and cement slurries. The subterranean formation 305 may a reservoir for oil, gas, and water or may be a depleted formation. In embodiments the subterranean formation 305 is used for carbon capture underground storage. As illustrated, a wellbore 310 may be drilled into the subterranean formation 305. While wellbore 310 is shown extending generally vertically into the subterranean formation 305, the principles described herein are also applicable to wellbores that extend at an angle through the subterranean formation 305, such as horizontal and slanted wellbores. As illustrated, the wellbore 310 comprises walls 315. In the illustration, casing 330 may be cemented to the walls 315 of the wellbore 310 by cement sheath 320. In the illustration, one or more additional conduits (e.g., intermediate casing, production casing, liners, etc.), shown here as casing 330 may also be disposed in the wellbore 310. As illustrated, there is a wellbore annulus 335 formed between the casing 330 and the walls 315 of the wellbore 310. One or more centralizers 340 may be attached to the casing 330, for example, to centralize the casing 330 in the wellbore 310 prior to and during the cementing operation. The cement slurry 300 may be pumped down the interior of the casing 330. The cement slurry 300 may be allowed to flow down the interior of the casing 330 through the casing shoe 345 at the bottom of the casing 330 and up around the casing 330 into the wellbore annulus 335. The cement slurry 300 may be allowed to set in the wellbore annulus 335, for example, to form a cement sheath that supports and positions the casing 330 in the wellbore 310. While not illustrated, other techniques may also be utilized for introduction of the cement slurry 300. By way of example, reverse circulation techniques may be used that include introducing the cement slurry 300 into the subterranean formation 305 by way of the wellbore annulus 335 instead of through the casing 330. As it is introduced, the cement slurry 300 may displace other fluids 350, such as drilling fluids and/or spacer fluids that may be present in the interior of the casing 330 and/or the wellbore annulus 335. While not illustrated, at least a portion of the displaced fluids 350 may exit the wellbore annulus 335 via a flow line and be deposited, for example, in one or more retention pits. A bottom plug 355 may be introduced into the wellbore 310 ahead of the cement slurry 300, for example, to separate the cement slurry 300 from the fluids 350 that may be inside the casing 330 prior to cementing. After the bottom plug 355 reaches the landing collar 380, a diaphragm or other suitable device should rupture to allow the cement slurry 300 through the bottom plug 355. The bottom plug 355 is shown on the landing collar 380. In the illustration, a top plug 385 may be introduced into the wellbore 310 behind the cement slurry 300. The top plug 360 may separate the cement slurry 300 from a displacement fluid 365 and also push the cement slurry 300 through the bottom plug 355.

The following statements may describe certain embodiments of the disclosure but should be read to be limiting to any particular embodiment.

Statement 1. A method of designing a cement slurry comprising: (a) selecting a target permeability and a density requirement; (b) inputting the target permeability into a permeability model and generating a proposed cement composition using the permeability model, wherein the proposed cement composition comprises at least a cement and concentration thereof, and a water and concentration thereof such that a cement slurry formed from the proposed cement composition and the water and concentration thereof meet the density requirement; (c) preparing the cement slurry based on the proposed cement composition; and (d) introducing the cement slurry into a wellbore and allowing the cement slurry to set to form a hardened cement.

Statement 2. The method of statement 1, further comprising: (e) preparing a test cement slurry based on the proposed cement composition; (f) permeability testing the test cement slurry to form a tested permeability; and (g) comparing the tested permeability to the target permeability and performing steps (b)-(g) if the tested permeability is higher than the target permeability, wherein the step of generating the proposed cement composition comprises selecting different concentrations and/or different chemical identities for the cement and/or one or the more supplementary cementitious materials than previously selected.

Statement 3. The method of any of statements 1-2 wherein the target permeability is in a range of 0 nD to 500 mD.

Statement 4. The method of any of statements 1-3 wherein the permeability model comprises an equation of linear form, polynomial form, trigonometric form, exponential form, logarithmic form, power law form, integral form, derivative form, parametric form, and combinations thereof.

Statement 5. The method of any of statements 1-4 wherein the permeability model comprises the following equation:

$$K = A_0 \left( \frac{\text{vol water}}{\text{vol slurry}} \right)^{A_1} \times e^{A_2 PSD} \times e^{A_3 \frac{CaO}{SiO_2}}$$

where K is permeability, vol water is volume of water, vol slurry is volume of slurry, PSD is particle size distribution of particles in the cement slurry, $$\frac{CaO}{SiO_2}$$

is calcium oxide to silica ratio in the cement slurry, and $A_0$, $A_1$, $A_2$, and $A_3$ are model coefficients.

Statement 6. The method of any of statements 1-5 wherein the permeability model comprises the following equation:

$$K = A_0 + A_1 \left( \frac{\text{vol water}}{\text{vol slurry}} \right) + A_2 PSD + A_3 \frac{CaO}{SiO_2} + A_4 C_{inerts}$$

where K is permeability, vol water is volume of water, vol slurry is volume of slurry, PSD is particle size distribution of particles in the cement slurry, $$\frac{CaO}{SiO_2}$$

is calcium oxide to silica ratio in the cement slurry, $C_{inerts}$ is the concentration of inert materials in the cement slurry, and $A_0$, $A_1$, $A_2$, $A_3$, and $A_4$ are model coefficients.

Statement 7. The method of any of statements 1-6 wherein the cement is selected from the group consisting of portland cements, pozzolana cements, gypsum cements, alumina cements, silica cements, and combinations thereof.

Statement 8. The method of any of statements 1-7 wherein the proposed cement composition further comprises one or more chemical additives is selected from the group consisting of weighting agents, lightweight additives, gas-generating additives, mechanical-property-enhancing additives, lost-circulation control materials, filtration-control additives, fluid-loss-control additives, defoaming agents, foaming agents, thixotropic additives, dispersants, suspending aids, viscosifiers, transition time control additives, cement set retarders, cement accelerators, and combinations thereof, and concentration thereof.

Statement 9. The method of any of statements 1-8 further comprising introducing the cement slurry prepared based on the proposed cement composition into a wellbore penetrating a subterranean formation.

Statement 10. The method of statement 9 wherein the subterranean formation is a carbon capture underground storage well.

Statement 11. A method comprising: (a) providing cement components comprising a plurality of cements, supplementary cementitious materials, inert materials, and chemical additives; (b) analyzing physicochemical properties of the cement components; (c) preparing a plurality of cement slurries comprising various amounts of the cement components and water; (d) curing the plurality of cement slurries at various temperatures and pressures to form a plurality of cured cements; (e) performing permeability tests on each of the plurality of cured cements; and (f) fitting a permeability model using regression analysis of the permeability of each of the plurality of cured cements, composition of the plurality of cement slurries, the physicochemical properties of the cement components, curing pressure, and curing temperature, to form a fitted permeability model.

Statement 12. The method of any of statements 11-12 wherein the permeability model comprises at least one equation form selected from the group consisting of linear form, polynomial form, trigonometric form, exponential form, logarithmic form, power law form, integral form, derivative form, parametric form, and combinations thereof.

Statement 13. The method of any of statements 11-12 wherein the regression analysis comprises at least one regression selected from the group consisting of linear regression, multiple linear regression, multivariate regression, polynomial regression, quantile regression, ridge regression, lasso regression, elastic net regression, principal components regression, partial least regression, support vector regression, and combinations thereof.

Statement 14. The method of any of statements 11-13 further comprising: (g) selecting a target permeability and a density requirement; (h) inputting the target permeability into the fitted permeability model and generating a proposed cement composition using the fitted permeability model, wherein the proposed cement composition comprises at least a cement and concentration thereof, a water and concentration thereof, and one or more supplementary cementitious materials and a water and concentration thereof such that a cement slurry formed from the proposed cement composition and the water and concentration thereof meet the density requirement; (i) preparing the cement slurry based on the proposed cement composition and allowing the cement slurry to set to form a hardened cement; (j) permeability testing the hardened cement to form a tested permeability; and (k) comparing the tested permeability to the target permeability and performing steps (h)-(k) if the tested permeability is higher than the target permeability, wherein the step of generating the proposed cement composition comprises selecting different concentrations and/or different chemical identities for the cement and/or one or the more supplementary cementitious materials than previously selected.

Statement 15. The method of any of statements 11-14 wherein the target permeability is in a range of 0 nD to 500 mD.

Statement 16. The method of any of statements 11-15 wherein the fitted permeability model comprises the following equation:

$$K = A_0 \left(\frac{\text{vol water}}{\text{vol slurry}}\right)^{A_1} \times e^{A_2 PSD} \times e^{A_3 \frac{CaO}{SiO_2}}$$

where K is permeability, vol water is volume of water, vol slurry is volume of slurry, PSD is particle size distribution of particles in the cement slurry, $$\frac{CaO}{SiO_2}$$

is calcium oxide to silica ratio in the cement slurry, and $A_0$, $A_1$, $A_2$, and $A_3$ are model coefficients.

Statement 17. The method of any of statements 11-16 wherein the fitted permeability model comprises the following equation:

$$K = A_0 + A_1 \left(\frac{\text{vol water}}{\text{vol slurry}}\right) + A_2 PSD + A_3 \frac{CaO}{SiO_2} + A_4 C_{inerts}$$

where K is permeability, vol water is volume of water, vol slurry is volume of slurry, PSD is particle size distribution of particles in the cement slurry, $$\frac{CaO}{SiO_2}$$

is calcium oxide to silica ratio in the cement slurry, $C_{inerts}$ is the concentration of inert materials in the cement slurry, and $A_0$, $A_1$, $A_2$, $A_3$, and $A_4$ are model coefficients.

Statement 18. The method of any of statements 11-17 wherein the cement is selected from the group consisting of portland cements, pozzolana cements, gypsum cements, alumina cements, silica cements, and combinations thereof.

Statement 19. The method of any of statements 11-18 wherein one or more supplementary cementitious material is selected from the group consisting of fly ash, blast furnace slag, silica fume, pozzolans, kiln dust, clays, and combinations thereof.

Statement 20. The method of any of statements 11-19 wherein the proposed cement composition further comprises one or more chemical additives is selected from the group consisting of weighting agents, lightweight additives, gas-generating additives, mechanical-property-enhancing additives, lost-circulation control materials, filtration-control additives, fluid-loss-control additives, defoaming agents, foaming agents, thixotropic additives, dispersants, suspending aids, viscosifiers, transition time control additives, cement set retarders, cement accelerators, and combinations thereof, and concentration thereof.

EXAMPLE

Figure 4:
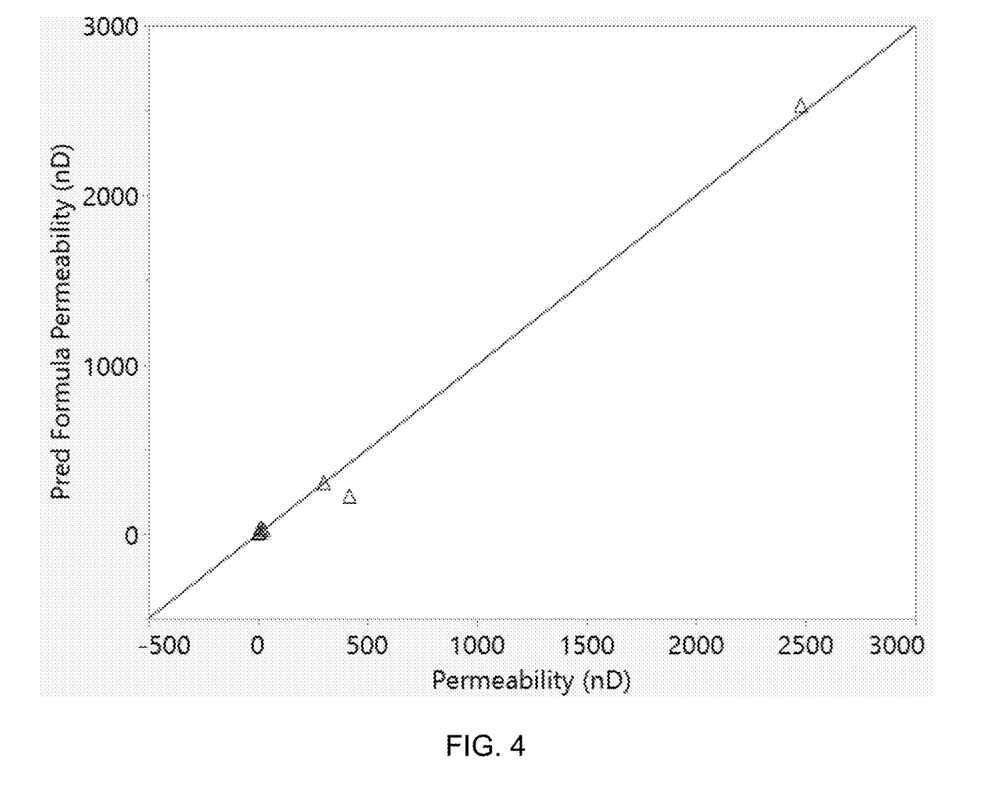
FIG. 4 is a parity plot of the predicted permeability versus observed permeability for a cement developed with a permeability mode.

Cement slurries were prepared with varying amounts of cement, supplementary cementitious materials, and water to cement ratios. The cement slurries were allowed to set, and permeability tests were performed on each of the set cements. Equation 3 from above was used to calculate a predicted permeability using the coefficients from Table 1 in Equation 3. FIG. 4 is a parity plot of the predicted permeability versus observed permeability. It was observed that the model has an $R^2$ value of 0.93 indicating the model accurately predicted the permeability. The coefficients in Table 1 indicate that the increasing water content will increase permeability.

TABLE 1

| Coefficient | Value |
| --- | --- |
| A1 | 9.54 |
| A2 | −0.0969 |
| A3 | −4.58 |

The disclosed cement compositions and associated methods may directly or indirectly affect any pumping systems, which representatively includes any conduits, pipelines, trucks, tubulars, and/or pipes which may be coupled to the pump and/or any pumping systems and may be used to fluidically convey the cement compositions downhole, any pumps, compressors, or motors (e.g., topside or downhole) used to drive the cement compositions into motion, any valves or related joints used to regulate the pressure or flow rate of the cement compositions, and any sensors (i.e., pressure, temperature, flow rate, etc.), gauges, and/or combinations thereof, and the like. The cement compositions may also directly or indirectly affect any mixing hoppers and retention pits and their assorted variations.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the elements that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present disclosure is well adapted to attain the ends and advantages mentioned as well as those that are inherent therein. The particular examples disclosed above are illustrative only, as the present disclosure may be modified and practiced in different but equivalent manners apparent to those skilled in the art having the benefit of the teachings herein. Although individual examples are discussed, the disclosure covers all combinations of all those examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A method of designing a cement slurry comprising:
   (a) selecting a target permeability and a density requirement;
   (b) inputting the target permeability into a permeability model and generating a proposed cement composition using the permeability model, wherein the proposed cement composition comprises at least a dry blend of cement and concentration thereof, and a water and concentration thereof, such that a cement slurry formed from the proposed cement composition meets the density requirement, wherein the permeability model is a function of film forming additives, volume average value of particle size distribution comprising D30, D50, D70, and/or D90 of solids in the dry blend, and mass averaged values comprising at least one mass averaged value selected from the group consisting of Ca/Si, Ca/Al, Si/Al ratio of the dry blend, and any combination thereof;
   (c) preparing the cement slurry based on the proposed cement composition; and
   (d) introducing the cement slurry into a wellbore and allowing the cement slurry to set to form a hardened cement.

2. The of claim 1 further comprising:
   (e) preparing a test cement slurry based on the proposed cement composition;
   (f) permeability testing the test cement slurry to form a tested permeability; and
   (g) comparing the tested permeability to the target permeability and performing steps (b)-(g) if the tested permeability is higher than the target permeability, wherein the step of generating the proposed cement composition comprises selecting different concentrations and/or different chemical identities for the cement and/or one or more supplementary cementitious materials than previously selected.

3. The method of claim 1 wherein the target permeability is in a range of 0 nD to 500 mD.

4. The method of claim 1 wherein the permeability model comprises an equation of linear form, polynomial form, trigonometric form, exponential form, logarithmic form, power law form, integral form, derivative form, parametric form, and combinations thereof.

5. The method of claim 1 wherein the permeability model comprises the following equation:

$$K = A_0 \left( \frac{\text{vol water}}{\text{vol slurry}} \right)^{A_1} \times e^{A_2 PSD} \times e^{A_3 \frac{CaO}{SiO_2}}$$

where K is permeability, vol water is volume of water, vol slurry is volume of slurry, PSD is particle size distribution of particles in the cement slurry, $$\frac{CaO}{SiO_2}$$

is calcium oxide to silica ratio in the cement slurry, and $A_0$, $A_1$, $A_2$, and $A_3$ are model coefficients.

6. The method of claim 1 wherein the permeability model comprises the following equation:

$$K = A_0 + A_1 \left( \frac{\text{vol water}}{\text{vol slurry}} \right) + A_2 PSD + A_3 \frac{CaO}{SiO_2} + A_4 C_{inerts}$$

where K is permeability, vol water is volume of water, vol slurry is volume of slurry, PSD is particle size distribution of particles in the cement slurry, $$\frac{CaO}{SiO_2}$$

is calcium oxide to silica ratio in the cement slurry, $C_{inerts}$ is the concentration of inert materials in the cement slurry, and $A_0$, $A_1$, $A_2$, $A_3$, and $A_4$ are model coefficients.

7. The method of claim 1 wherein the cement is selected from the group consisting of portland cements, pozzolana cements, gypsum cements, alumina cements, silica cements, and combinations thereof.

8. The method of claim 1 wherein the proposed cement composition further comprises one or more chemical additives selected from the group consisting of weighting agents, lightweight additives, gas-generating additives, mechanical-property-enhancing additives, lost-circulation control materials, filtration-control additives, fluid-loss-control additives, defoaming agents, foaming agents, thixotropic additives, dispersants, suspending aids, viscosifiers, transition time control additives, cement set retarders, cement accelerators, and combinations thereof, and concentration thereof.

9. The method of claim 1 further comprising introducing the cement slurry prepared based on the proposed cement composition into a wellbore penetrating a subterranean formation.

10. The method of claim 9 wherein the subterranean formation is a carbon capture underground storage well.

11. A method comprising:
   (a) providing cement components comprising a plurality of cements each comprising a dry blend of cement, supplementary cementitious materials, inert materials, and chemical additives;
   (b) analyzing physicochemical properties of the cement components;
   (c) preparing a plurality of cement slurries comprising various amounts of the cement components and water;
   (d) curing the plurality of cement slurries at various temperatures and pressures to form a plurality of cured cements;

(e) performing permeability tests on each of the plurality of cured cements; and
(f) fitting a permeability model using regression analysis of the permeability of each of the plurality of cured cements, composition of the plurality of cement slurries, the physicochemical properties of the cement components, curing pressure, and curing temperature, to form a fitted permeability model, wherein the permeability model is a function of film forming additives, volume average value of particle size distribution comprising D30, D50, D70, and/or D90 of solids in the dry blend, and mass averaged values comprising at least one mass averaged value selected from the group consisting of Ca/Si, Ca/Al, Si/Al ratio of the dry blend, and any combination thereof.

12. The method of claim 11 wherein the permeability model comprises at least one equation form selected from the group consisting of linear form, polynomial form, trigonometric form, exponential form, logarithmic form, power law form, integral form, derivative form, parametric form, and combinations thereof.

13. The method of claim 11 wherein the regression analysis comprises at least one regression selected from the group consisting of linear regression, multiple linear regression, multivariate regression, polynomial regression, quantile regression, ridge regression, lasso regression, elastic net regression, principal components regression, partial least regression, support vector regression, and combinations thereof.

14. The method of claim 11 further comprising:
(g) selecting a target permeability and a density requirement;
(h) inputting the target permeability into the fitted permeability model and generating a proposed cement composition using the fitted permeability model, wherein the proposed cement composition comprises at least the plurality of cements and concentration thereof, the water and concentration thereof, and one or the more of the supplementary cementitious materials and a concentration thereof, such that a cement slurry formed from the proposed cement composition meets the density requirement, wherein the permeability model is a function of film forming additives, volume average value of particle size distribution comprising D30, D50, D70, and/or D90 of solids in the dry blend, and mass averaged values comprising at least one mass averaged value selected from the group consisting of Ca/Si, Ca/Al, Si/Al ratio of the dry blend, and any combination thereof;
(i) preparing the cement slurry based on the proposed cement composition and allowing the cement slurry to set to form a hardened cement;
(j) permeability testing the hardened cement to form a tested permeability; and
(k) comparing the tested permeability to the target permeability and performing steps (h)-(k) if the tested permeability is higher than the target permeability, wherein the step of generating the proposed cement composition comprises selecting different concentrations and/or different chemical identities for the Plurality of cements and/or one or the more of the supplementary cementitious materials than previously selected.

15. The method of claim 14 wherein the target permeability is in a range of 0 nD to 500 mD.

16. The method of claim 14 wherein the fitted permeability model comprises the following equation:

$$K = A_0 \left( \frac{\text{vol water}}{\text{vol slurry}} \right)^{A_1} \times e^{A_2 PSD} \times e^{A_3 \frac{CaO}{SiO_2}}$$

where K is permeability, vol water is volume of water, vol slurry is volume of slurry, PSD is particle size distribution of particles in the cement slurry, $$\frac{CaO}{SiO_2}$$

is calcium oxide to silica ratio in the cement slurry, and $A_0$, $A_1$, $A_2$, and $A_3$ are model coefficients.

17. The method of claim 14 wherein the fitted permeability model comprises the following equation:

$$K = A_0 + A_1 \left( \frac{\text{vol water}}{\text{vol slurry}} \right) + A_2 PSD + A_3 \frac{CaO}{SiO_2} + A_4 C_{inerts}$$

where K is permeability, vol water is volume of water, vol slurry is volume of slurry, PSD is particle size distribution of particles in the cement slurry, $$\frac{CaO}{SiO_2}$$

is calcium oxide to silica ratio in the cement slurry, $C_{inerts}$ is the concentration of inert materials in the cement slurry, and $A_0$, $A_1$, $A_2$, $A_3$, and $A_4$ are model coefficients.

18. The method of claim 14 wherein the cement is selected from the group consisting of portland cements, pozzolana cements, gypsum cements, alumina cements, silica cements, and combinations thereof.

19. The method of claim 14 wherein one or more supplementary cementitious material is selected from the group consisting of fly ash, blast furnace slag, silica fume, pozzolans, kiln dust, clays, and combinations thereof.

20. The method of claim 14 wherein the proposed cement composition further comprises one or more chemical additives selected from the group consisting of weighting agents, lightweight additives, gas-generating additives, mechanical-property-enhancing additives, lost-circulation control materials, filtration-control additives, fluid-loss-control additives, defoaming agents, foaming agents, thixotropic additives, dispersants, suspending aids, viscosifiers, transition time control additives, cement set retarders, cement accelerators, and combinations thereof, and concentration thereof.

* * * * *